United States Patent
Hara et al.

(10) Patent No.: US 8,489,277 B2
(45) Date of Patent: Jul. 16, 2013

(54) ELECTRONIC SUSPENSION CONTROL APPARATUS

(75) Inventors: Nobukatsu Hara, Osaka (JP); Satoshi Kitamura, Nara (JP)

(73) Assignee: Shimano Inc., Osaka (JP)

( * ) Notice: Subject to any disclaimer, the term of this patent is extended or adjusted under 35 U.S.C. 154(b) by 477 days.

(21) Appl. No.: 12/759,937

(22) Filed: Apr. 14, 2010

(65) Prior Publication Data
US 2011/0257841 A1 Oct. 20, 2011

(51) Int. Cl.
*B62K 25/04* (2006.01)

(52) U.S. Cl.
USPC .................................... 701/37; 280/283

(58) Field of Classification Search
USPC .............. 701/37; 74/501.6, 502.2, 473.3, 74/500.5; 280/5.515, 124.134, 124.153, 260, 280/261, 275, 276, 279, 284, 286, 5.514, 280/283, 282; 188/275, 314, 322.13, 282.1
See application file for complete search history.

(56) References Cited

U.S. PATENT DOCUMENTS

| | | | |
|---|---|---|---|
| 5,324,058 A | 6/1994 | Massaro | |
| 5,354,085 A | 10/1994 | Gally | |
| 5,791,674 A | 8/1998 | D'Aluisio et al. | |
| 5,921,572 A | 7/1999 | Brad et al. | |
| 6,026,939 A | 2/2000 | Girvin et al. | |
| 6,050,583 A | 4/2000 | Bohn | |
| 6,149,174 A | 11/2000 | Bohn | |
| 6,244,398 B1 | 6/2001 | Girvin et al. | |
| 6,336,648 B1 | 1/2002 | Bohn | |
| 6,543,799 B2 | 4/2003 | Miyoshi | |
| 6,595,537 B2 | 7/2003 | Miyoshi | |
| 6,612,599 B2 | 9/2003 | Miyoshi | |
| 6,619,684 B2* | 9/2003 | Miyoshi | 280/283 |
| 6,641,155 B2* | 11/2003 | Stanfield | 280/124.159 |
| 6,734,376 B2 | 5/2004 | Ichida et al. | |
| 6,741,045 B2 | 5/2004 | Kitamura | |
| 6,835,069 B2 | 12/2004 | Kitamura et al. | |
| 6,863,291 B2 | 3/2005 | Miyoshi | |
| 6,964,203 B2 | 11/2005 | Crasset | |
| 7,163,222 B2 | 1/2007 | Becket et al. | |
| 7,325,661 B2 | 2/2008 | Chen | |
| 7,350,787 B2 | 4/2008 | Voss | |
| 7,434,823 B2 | 10/2008 | Robinson | |
| 2001/0030408 A1* | 10/2001 | Miyoshi | 280/276 |
| 2003/0020252 A1* | 1/2003 | Stanfield | 280/124.161 |
| 2003/0020255 A1 | 1/2003 | Felsl et al. | |
| 2003/0094784 A1* | 5/2003 | Miyoshi | 280/284 |
| 2003/0132600 A1* | 7/2003 | Miyoshi | 280/276 |
| 2005/0280244 A1 | 12/2005 | Watarai | |
| 2006/0064223 A1 | 3/2006 | Voss | |
| 2007/0007743 A1* | 1/2007 | Becker et al. | 280/276 |
| 2008/0116622 A1 | 5/2008 | Fox | |

(Continued)

FOREIGN PATENT DOCUMENTS

DE 195 32 088 A1 3/1997
EP 1 129 937 A2 9/2001

*Primary Examiner* — Marthe Marc-Coleman
(74) *Attorney, Agent, or Firm* — Global IP Counselors (57) ABSTRACT

An electronic suspension control apparatus is provided with a signal receiving section, a suspension lockout determination section and a signal output section. The signal receiving section selectively receives input signals. The suspension lockout determination section determines a suspension lockout state. The signal output section outputs a temporary lockout release signal in response to the signal receiving section receiving a suspension height adjustment signal as one of the input signals while the suspension lockout determination section determines that a suspension lockout state exists.

7 Claims, 9 Drawing Sheets

U.S. PATENT DOCUMENTS

| | | |
|---|---|---|
| 2008/0282830 A1 | 11/2008 | Hara |
| 2009/0033044 A1* | 2/2009 | Linsmeier .................. 280/5.514 |
| 2009/0064813 A1* | 3/2009 | Hara et al. ...................... 74/489 |
| 2009/0192673 A1 | 7/2009 | Song et al. |
| 2009/0255768 A1* | 10/2009 | Inoue ............................ 188/313 |
| 2009/0308194 A1* | 12/2009 | Shahana ...................... 74/502.2 |
| 2011/0062629 A1* | 3/2011 | Gaiser ........................ 264/297.2 |
| 2012/0130591 A1* | 5/2012 | Song et al. ...................... 701/37 |

* cited by examiner

ELECTRONIC SUSPENSION CONTROL APPARATUS

BACKGROUND

1. Field of the Invention

This invention generally relates to an electronic suspension control apparatus. More specifically, the present invention relates to an electronic suspension control apparatus that includes a height adjustment function and a lockout function.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In the past, most bicycles had rigid frames which typically transmitted the shocks resulting from rough riding surfaces directly to the rider. In other words, most bicycles were not provided with any front or rear suspension. Recently, bicycles, especially mountain bikes (MTB) and all terrain bikes (ATB), have been outfitted with front and/or rear suspension assemblies to absorb the shocks transmitted to the rider when riding on a rough road.

On most mountain bicycles, the front fork contains a set of shock absorbers. The shock absorber usually includes a spring and a damper or dashpot. The spring can be implemented with a steel or titanium coil, an elastomer, or even compressed air. The damper is usually implemented by forcing oil to pass through one or more small openings or shim stacks. On some bicycles, the spring, the damper, or both may be adjusted for rider weight, riding style, terrain, or any combination of these or other factors. Also, the two components are sometimes separated with the spring mechanism being in one leg and the damper being in the other leg. In these bicycles with front suspension forks, it is sometimes desirable to be able to adjust the suspension stroke, adjust the spring rate of the spring mechanism, adjust a damping force, and/or lockout the suspension, as needed and/or desired. Thus, there have been proposals to provide suspensions that include adjustors for adjusting the suspension stroke and/or the spring rate of the spring mechanism.

On example of a bicycle suspension that has a suspension stroke (height) adjustment and a suspension lockout is disclosed in U.S. Pat. No. 7,163,222. In this patent, the bicycle suspension is provided with two independent operating members, which control the suspension stroke (height) adjustment and the suspension lockout, respectively. In this patent, the operating members are manually operated. Motor driven actuators are also used for controlling a suspension stroke (height) adjustment and a suspension lockout as disclosed in U.S. Patent Publication No. 2009/0255768. In either case, when the suspension is locked out and the rider wants to change the height of suspension, the rider must first operate a first operating member or motor driven actuator for unlocking suspension, and then the rider has to operate a second operating member or motor driven actuator for adjusting the stroke (height). Finally, the rider then has to operate the first operating member again for locking out suspension.

SUMMARY

One aspect is to provide of the present disclosure is to provide an electronic suspension control apparatus that allows the rider can change the height (stroke) easily, when the suspension is locked out.

In view of the state of the known technology, an electronic suspension control apparatus is provided that mainly comprises a signal receiving section, a suspension lockout determination section and a signal output section. The signal receiving section selectively receives input signals. The suspension lockout determination section determines a suspension lockout state. The signal output section outputs a temporary lockout release signal in response to the signal receiving section receiving a suspension height adjustment signal as one of the input signals while the suspension lockout determination section determines that a suspension lockout state exists.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
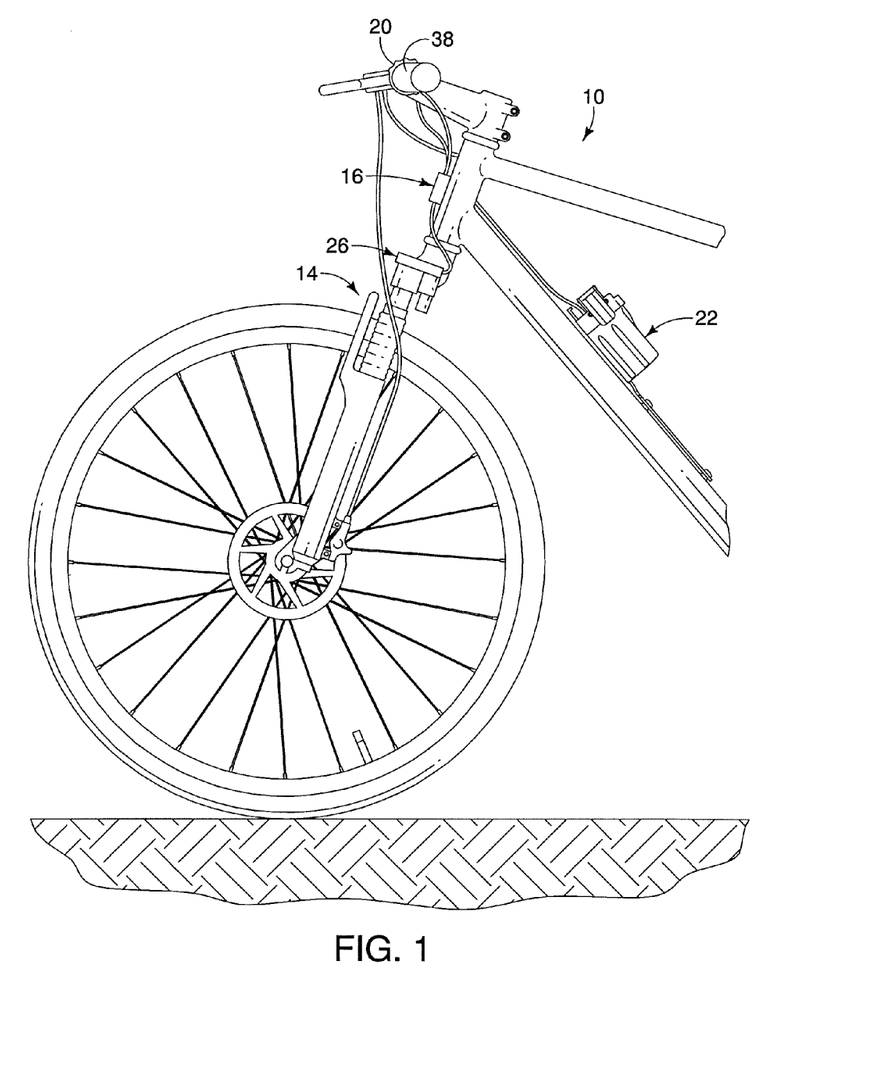
FIG. 1 is a side elevational view of a bicycle that is equipped with an electronic suspension control apparatus in accordance with one embodiment.

Referring initially to FIG. 1, a bicycle 10 is illustrated that is equipped with an electronic suspension control apparatus 12 in accordance with a first embodiment. The bicycle 10 includes a front suspension fork 14 with the electronic suspension control apparatus 12 electronically controlling a lockout function and a height adjustment function of the front suspension fork 14. As discussed below, the electronic suspension control apparatus 12 allows the rider to easily change the height (stroke) of the front suspension fork 14, while the front suspension fork 14 is locked out state. While the bicycle 10 is only provided with a front suspension, it will be apparent to those skilled in the art from this disclosure that the bicycle 10 can be provided with a rear shock absorber that includes a similar electronic suspension control apparatus allows the rider to easily change the height (stroke) of the rear shock absorber, while the rear shock absorber is locked out state. Thus, the electronic suspension control apparatus is used for not only the suspension which has two cylinders but can also be implemented in a suspension which has only one cylinder.

Figure 2:
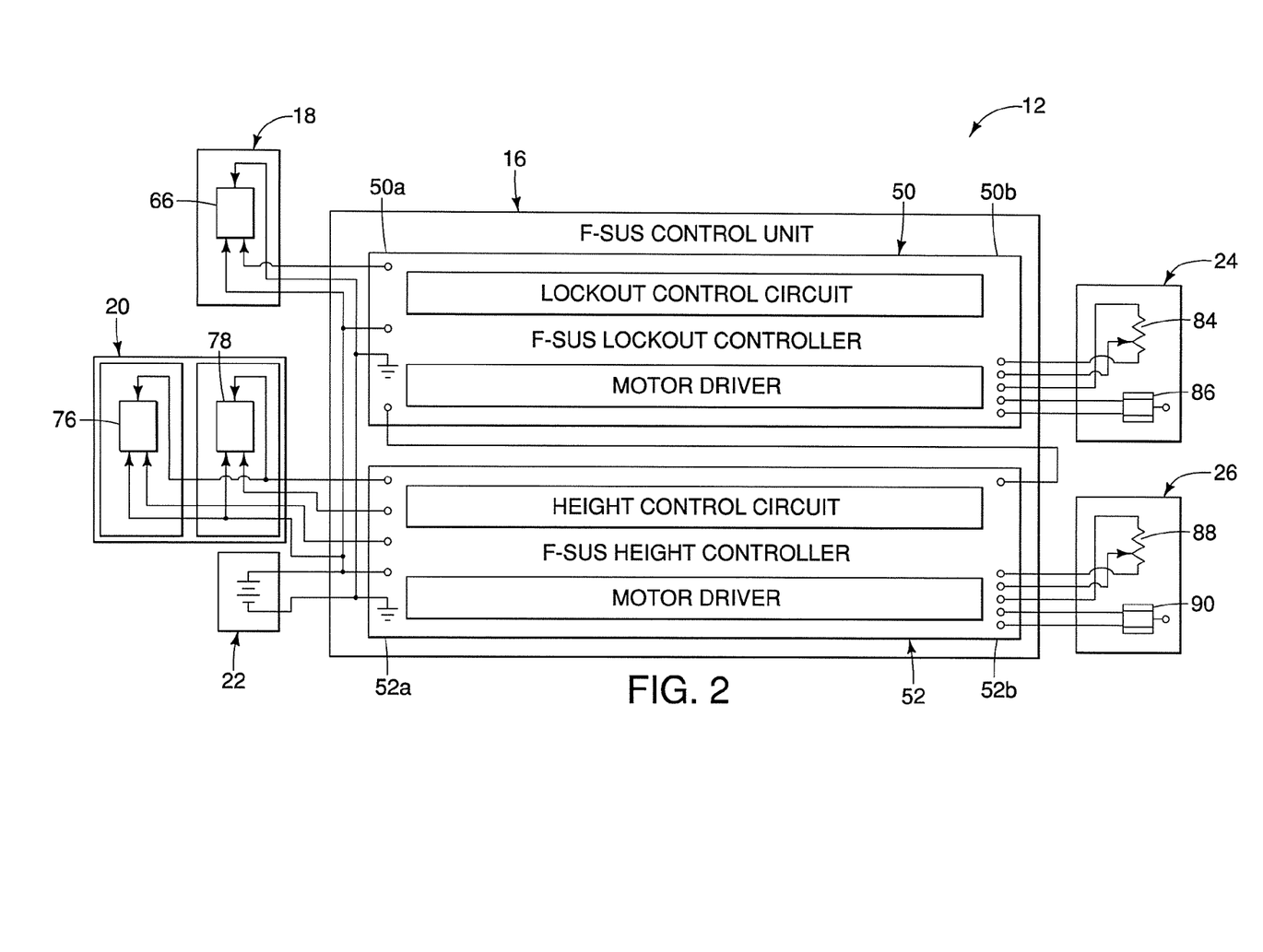
FIG. 2 is a block wiring diagram of the electronic suspension control apparatus for the bicycle illustrated in FIG. 1.

Basically, as seen in FIG. 2, the electronic suspension control apparatus 12 includes an electronic suspension control unit 16, a front suspension lockout control device 18, a front suspension height control device 20, a battery unit 22, a lockout drive unit 24 and a height adjustment drive unit 26. The front suspension fork 14 is provided with a lockout drive unit 24 and a height adjustment drive unit 26.

Figure 3:
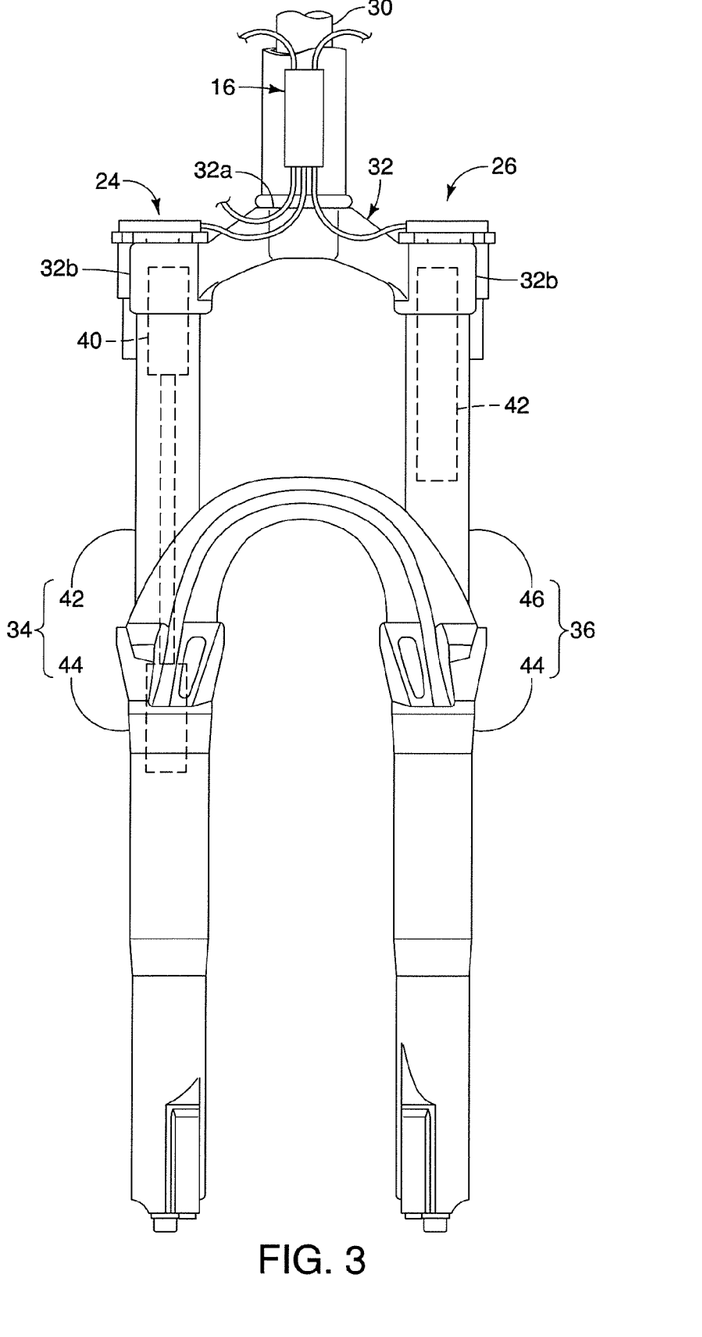
FIG. 3 is a front elevational view of the front suspension fork that is equipped with the electronic suspension control apparatus illustrated in FIG. 2.
Figure 4:
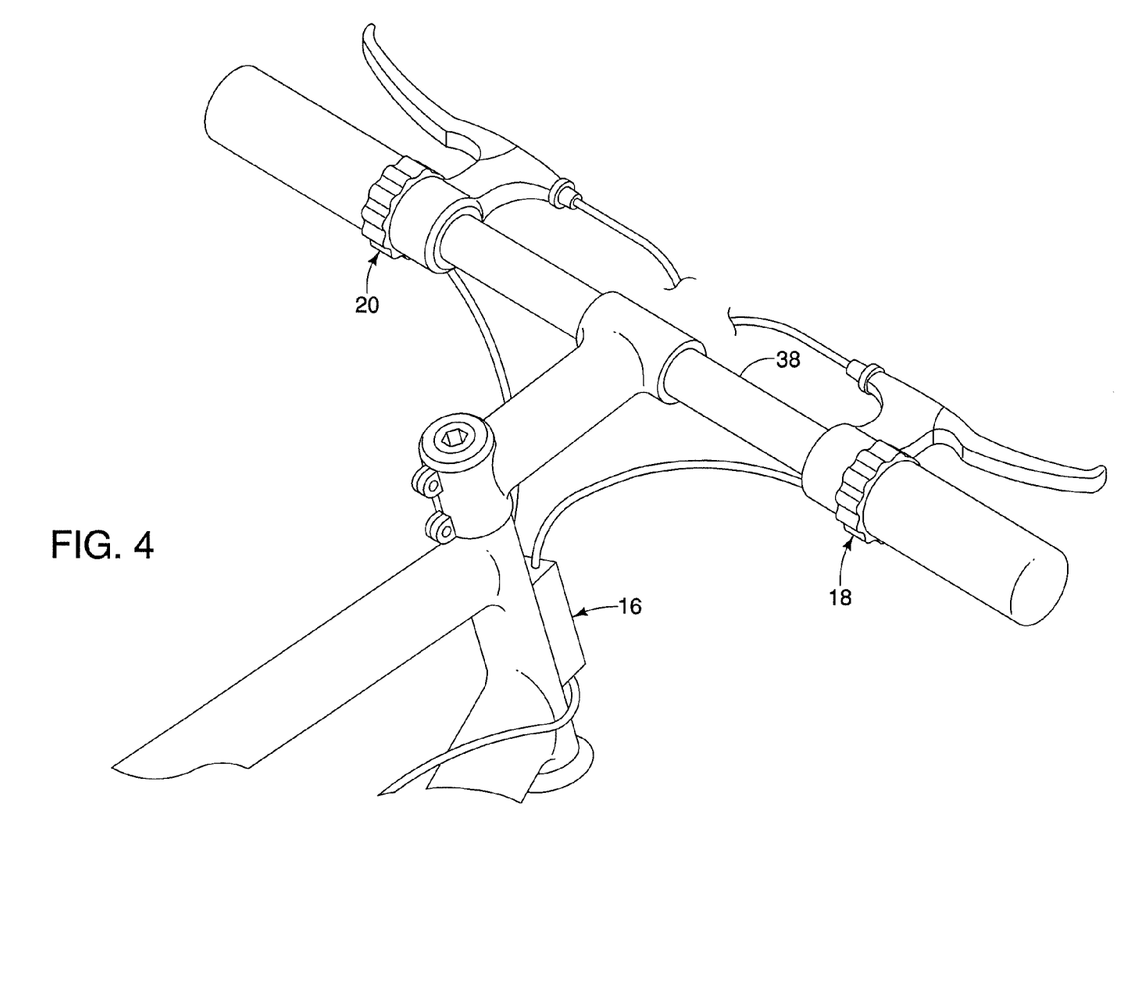
FIG. 4 is a perspective view of the handlebar area of the bicycle illustrated in FIG. 1, with the control devices of the electronic suspension control apparatus mounted to a straight type of handlebar.

As seen in FIG. 3, the front suspension fork 14 basically includes a steerer tube 30, a crown 32, a first leg or telescopic tube 34 and a second leg or telescopic tube 36. The legs 34 and 36 expand and contract for absorbing shocks while riding the bicycle 10 over rough terrain. The first leg 34 constitutes a first suspension assembly, while the second leg 36 constitutes a second suspension assembly. The crown 32 is secured to a bottom end of the steerer tube 30. The legs 34 and 36 are secured at opposite lateral end of the crown 32. Typically, as seen in FIGS. 1 and 4, a handlebar 38 of the bicycle 10 is fixedly mounted to the steerer tube 20 at its upper end for steering a front wheel. Thus, the steerer tube 30 provides a means for connection of the handlebar 38 to the front suspension fork 14.

Referring to FIG. 3, the lockout drive unit 24 is mounted on the upper end of the first leg 34. The front suspension fork 14 includes a lockout device 40 that is disposed within the first leg 34. The lockout drive unit 24 is operatively connected to the lockout device 40 for moving the lockout device 40 between a lockout position and a free (unlocked) position. The lockout devices for bicycle suspensions are well known in the bicycle field. Thus, the lockout device 40 can be any type of suitable lockout device as needed and/or desired. The lockout device 40 can be, for example, a damper cap assembly at the upper end of the first leg 34 that includes a compression lock-out for substantially preventing compression of the front suspension fork 14. The compression lock-out feature of the lockout device 40 is desirable so that the front suspension fork 14 can selectively behave substantially as a rigid fork while riding on smooth terrain to enhance both handling and power transfer to the rear wheel of the bicycle 10.

Still referring to FIG. 3, the height adjustment drive unit 26 is mounted on the upper end of the second leg 36. The front suspension fork 14 also includes a height adjustment device 42 that is disposed within the second leg 36. The height adjustment drive unit 26 is operatively connected to the height adjustment device 42 for moving the height adjustment device 42 between a plurality of height adjustment positions. The height adjustment devices for bicycle suspensions are well known in the bicycle field. Thus, the height adjustment device 42 can be any type of suitable height adjustment as needed and/or desired.

In the illustrated embodiment, the electronic suspension control unit 16 controls the front suspension fork 14. However, the electronic suspension control unit 16 can also be used with a rear suspension that includes one or more shock absorbers as needed and/or desired. As seen in FIG. 2, the electronic suspension control unit 16 basically includes a front suspension (F-SUS) lockout controller 50 and a front suspension (F-SUS) height controller 52. The lockout controller 50 and the height controller 52 are illustrated as two separate circuit boards. However, it is possible to make one circuit board, which includes circuitry for both lock out selection and height selection.

The lockout controller 50 controls the lockout device 40 via the lockout drive unit 24 in response to operation of the suspension lockout control device 18 for locking out and unlocking the front suspension fork 14. The height controller 52 controls the height adjustment device 42 response to operation of the front suspension height control device 20 for adjusting the height or stroke of the front suspension fork 14.

In the illustrated embodiment, as seen in FIG. 2, the lockout controller 50 includes a printed circuit board with a lockout control circuit and a lockout motor driver. The lockout control circuit includes a microcomputer. The battery unit 22 is electrically connected the lockout controller 50 to provide electrical power to the components of the lockout controller 50. The printed circuit board of the lockout controller 50 includes a signal receiving section 50a and a signal output section 50b. The signal receiving section 50a is electrically connected to the suspension lockout control device 18 and the height controller 52 such that input or control signals received from the suspension lockout control device 18 and the height controller 52 are processed by the lockout controller 50 as discussed below. The signal output section 50b is electrically connected to the lockout drive unit 24 for outputting control signals from the lockout controller 50 to the lockout drive unit 24. Thus, the lockout controller 50 operates the lockout drive unit 24 to selectively locks and unlocks the lockout device 40.

In the illustrated embodiment, as seen in FIG. 2, the lockout control circuit of the lockout controller 50 constitutes a suspension lockout determination section that determines a suspension lockout state of the front suspension fork 14. For example, the suspension lockout determination section of the lockout controller 50 determines the suspension lockout state of the front suspension fork 14 based on the input or control signal currently being received from the suspension lockout control device 18. In other words, the suspension lockout control device 18 outputs a control signal that is indicative of the suspension lockout state that is selected by the rider, and then the lockout controller 50 outputs a temporary lockout release signal based on this input or control signal from the suspension lockout control device 18. Alternatively, a stroke sensor can be used to as a suspension lockout determination section to determine a suspension lockout state of the front suspension fork 14, with the lockout controller 50 outputting a temporary lockout release signal based on a signal from the stroke sensor.

In the illustrated embodiment, as seen in FIG. 2, the height controller 52 includes a printed circuit board with a height control circuit and a height motor driver. The height control circuit includes a microcomputer. The battery unit 22 is electrically connected the height controller 52 to provide electrical power to the components of the height controller 52. The printed circuit board of the height controller 52 includes a signal receiving section 52a and a signal output section 52b. The signal receiving section 52a is electrically connected to the front suspension height control device 20 such that input or control signals (e.g., suspension height adjustment signals) received from the front suspension height control device 20 are processed by the height controller 52 as discussed below. The control signals (e.g., suspension height adjustment signals) from the front suspension height control device 20 can be any type of signal as needed and/or desired such as an adjustment value or a height position. The signal output section 52b is electrically connected to the height adjustment drive unit 26 for outputting control signals from the height controller 52 to the height adjustment drive unit 26. The signal output section 52b of the height controller 52 is also electrically connected to the lockout device 40. Thus, the height controller 52 operates the height adjustment drive unit 26 to selectively adjust the height adjustment device 42 with the lockout device 40 being temporarily unlock by the height controller 52 via the lockout controller 50, if the lockout device 40 is lock during adjustment of the height adjustment device 42.

In particular, upon the signal receiving section 52a of the height controller 52 receiving a suspension height adjustment signal as an input signal from the front suspension height control device 20, the signal output section 52b of the height controller 52 outputs a temporary lockout release signal to the signal receiving section 50a of the lockout controller 50. The suspension lockout determination section (e.g., the lockout control circuit) of the lockout controller 50 then determines if a suspension lockout state of the front suspension fork 14 exists. If the lockout determination section (e.g., the lockout control circuit) of the lockout controller 50 determines a suspension lockout state of the front suspension fork 14 exists, then the signal output section 50b of the lockout controller 50 outputs the temporary lockout release signal to the lockout drive unit 24 for moving the lockout device 40 to an unlocked position or state for a prescribed period of time. In this way, the temporary lockout release signal by the signal output section 50b of the lockout controller 50 is outputted in response to the signal receiving section 52a of the height controller 52 receiving a suspension height adjustment signal as an input signal while the suspension lockout determination section (e.g., the lockout control circuit) of the lockout controller 50 determines that a suspension lockout state exists.

Figure 5:
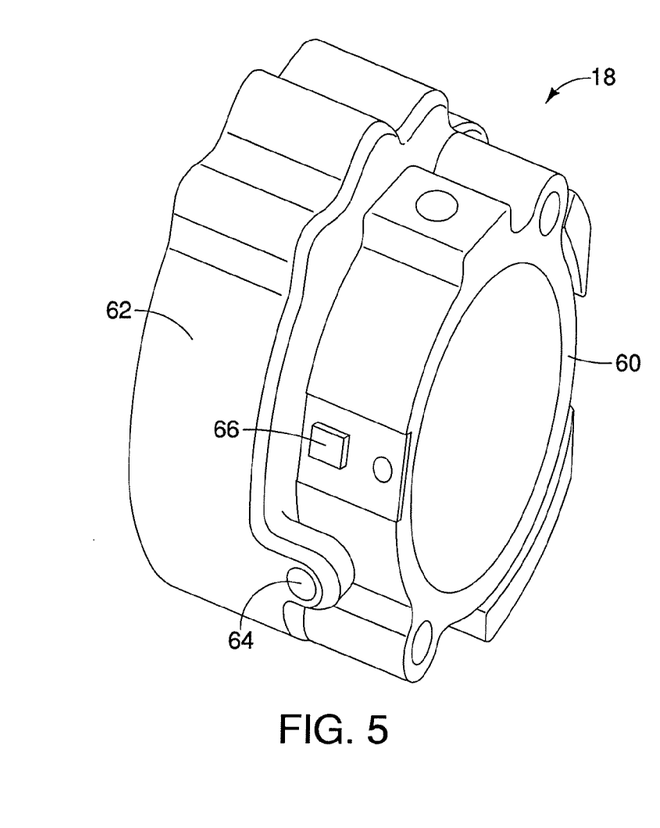
FIG. 5 is a perspective view of the suspension lockout control device for the electronic suspension control apparatus illustrated in FIG. 2.

As seen in FIGS. 2, 4 and 5, the suspension lockout control device 18 constitutes one example of a user input device that operatively coupled to the signal receiving section 50a of the lockout controller 50 to input a suspension lockout control signal to the signal receiving section 50a of the lockout controller 50. Of course, instead of the illustrated suspension lockout control device 18, it will be apparent from this disclosure that other types of user input devices can be used such as one or more push switch, one or more lever operated switches, etc.

As seen in FIG. 5, the suspension lockout control device 18 includes a mounting part 60, a user operating part 62, a magnet 64 and a Hall Effect sensing circuit 66. The mounting part 60 is an annular part that is fixedly secured to the handlebar 38. The user operating part 62 is rotatably mounted to the mounting part 60 for rotating around an axis which is substantially parallel to the handlebar 38. A low friction ring (not shown) is preferably disposed between the user operating part 62 and the mounting part 60 to minimize friction therebetween. A retaining ring (not shown) is preferably used to secure the user operating part 62 on the mounting part 60 in the same manner, as discussed below, in the suspension height control device 20. The magnet 64 is fixed to the user operating part 62, while the Hall Effect sensing circuit 66 is fixed to the mounting part 60. The user operating part 62 is operated by the rider between a lockout position and an unlocked (release) position. A detent arrangement can be provided to retain the user operating part 62 relative to the mounting part 60 in the lockout position and the unlocked position as needed and/or desired. If the Hall Effect sensing circuit 66 does not detect the magnet 64, the lockout controller 50 defines the user operating part 62 as being disposed in a datum position which corresponds to an off position in which the lockout controller 50 determines the suspension lockout control device 18 to be in the unlocked (release) position. Therefore it is not necessary to use two Hall Effect sensing circuits for detecting the lockout position and the unlocked position.

In particular, the user operating part 62 is in the lockout position when the user operating part 62 is rotated such that the magnet 64 aligns with the Hall Effect sensing circuit 66. When the user operating part 62 is rotated such that the magnet 64 aligns with the Hall Effect sensing circuit 66, the Hall Effect sensing circuit 66 outputs a suspension lockout control signal to the signal receiving section 50a of the lockout controller 50 to input the suspension lockout control signal to the signal receiving section 50a of the lockout controller 50. On the other hand, the user operating part 62 is in the unlocked position when the user operating part 62 is rotated such that the magnet 64 is offset from the Hall Effect sensing circuit 66. When the user operating part 62 is rotated such that the magnet 64 is offset from the Hall Effect sensing circuit 66, the Hall Effect sensing circuit 66 does not outputs any control signal to the signal receiving section 50a of the lockout controller 50. Accordingly, in this illustrated embodiment, the suspension lockout determination section (e.g., the lockout control circuit) of the lockout controller 50 determines the suspension lockout state of the front suspension fork 14 based on the existence or absence of the input or suspension lockout control signal currently being received from the suspension lockout control device 18.

As seen in FIGS. 2, 4 and 6 to 8, the suspension height control device 20 constitutes one example of a user input device that operatively coupled to the signal receiving section 52a of the height controller 52 to input the suspension height adjustment signal to the signal receiving section 52a of the height controller 52. Of course, instead of the illustrated suspension height control device 20, it will be apparent from this disclosure that other types of user input devices can be used such as one or more push switch, one or more lever operated switches, etc.

Figure 6:
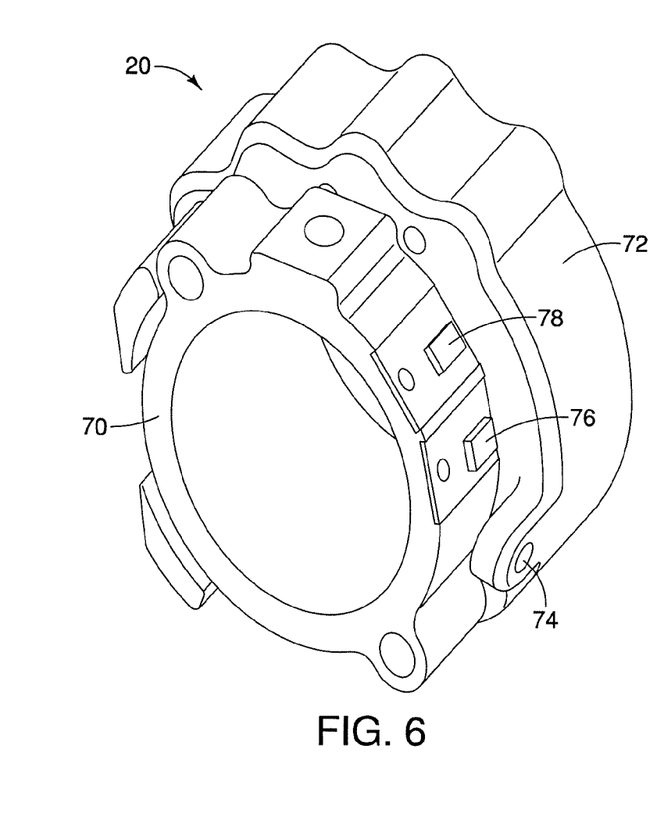
FIG. 6 is a perspective view of the suspension height control device for the electronic suspension control apparatus illustrated in FIG. 2.
Figure 7:
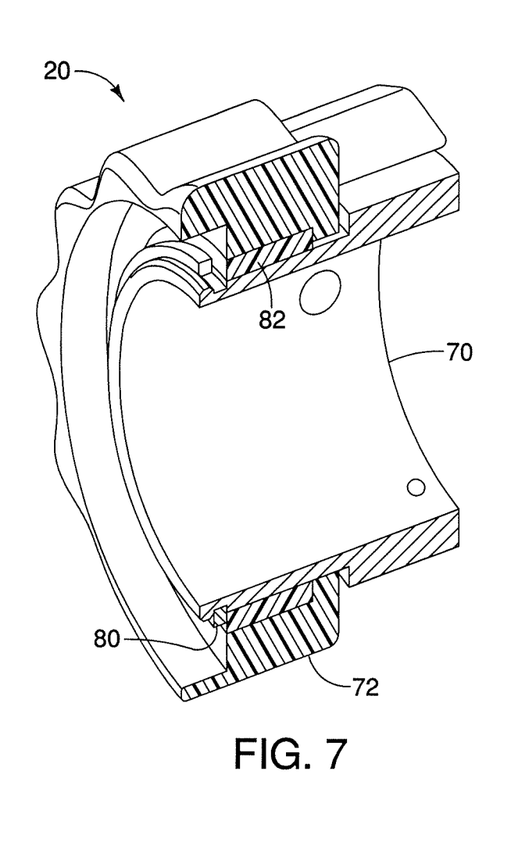
FIG. 7 is a cross sectional view of the suspension height control device for the electronic suspension control apparatus illustrated in FIG. 6.
Figure 8:
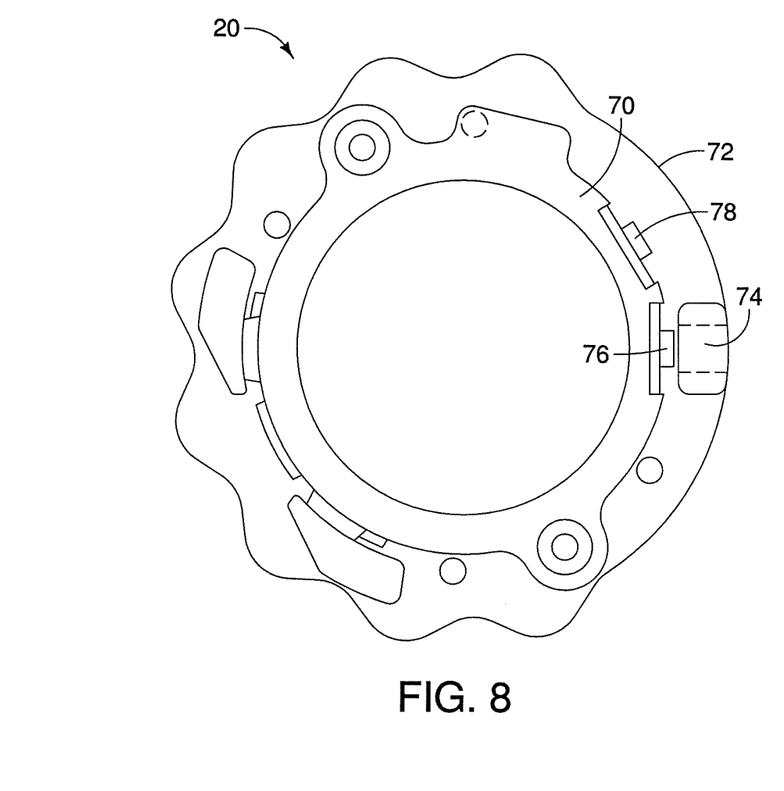
FIG. 8 is a simplified elevational view of the suspension height control device for the electronic suspension control apparatus illustrated in FIGS. 6 and 7.
Figure 9:
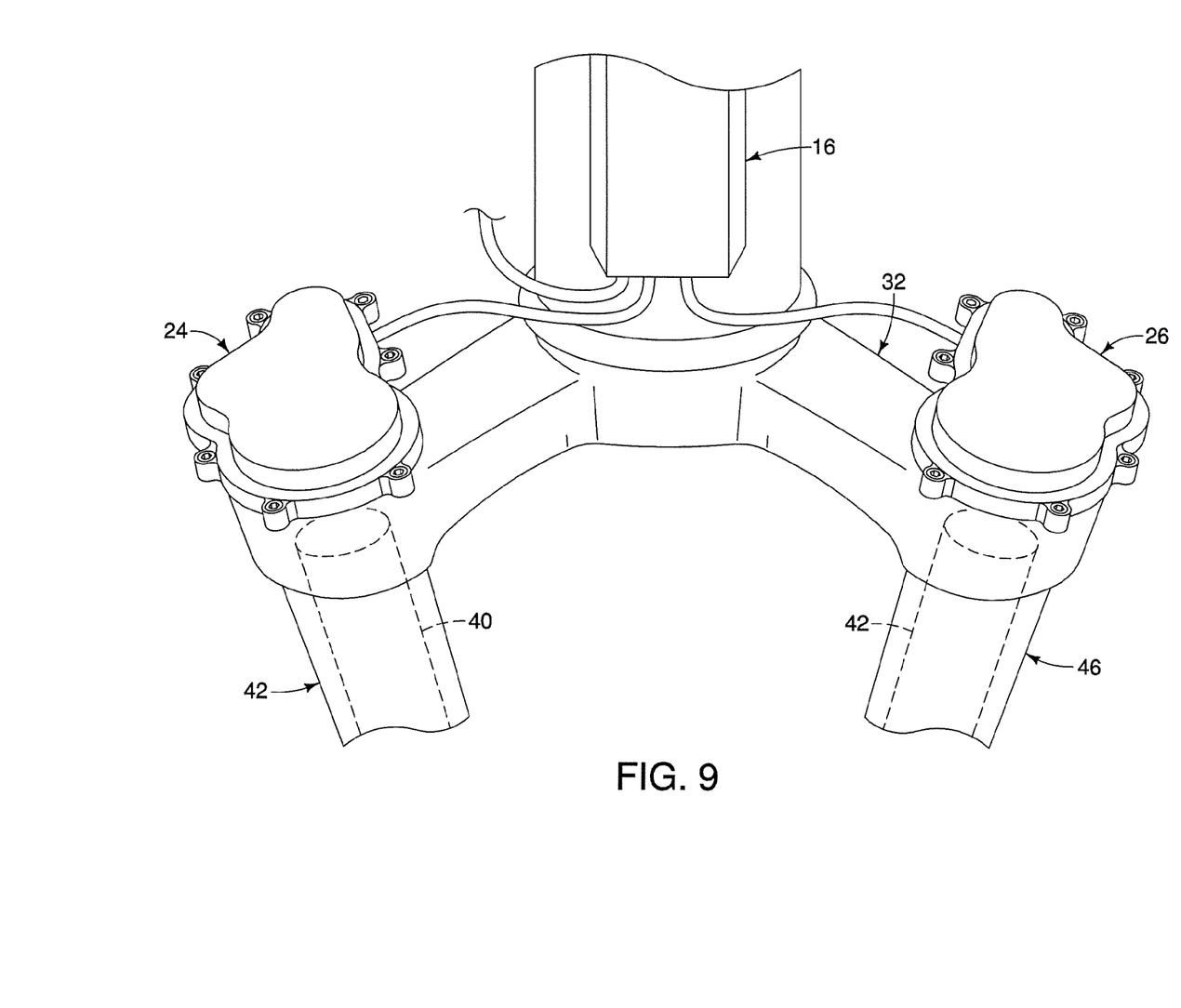
FIG. 9 is a partial perspective view of the front suspension for the electronic suspension control apparatus illustrated in FIG. 2.

As seen in FIGS. 6 to 8, the suspension height control device 20 includes a mounting part 70, a user operating part 72, a magnet 74, a first Hall Effect sensing circuit 76 and a second Hall Effect sensing circuit 78 and a retaining ring 80. The mounting part 70 is an annular part that is fixedly secured to the handlebar 38. The user operating part 72 is rotatably mounted to the mounting part 70 for rotating around an axis which is substantially parallel to the handlebar 38. A low friction ring 82 is disposed between the user operating part 72 and the mounting part 70 to minimize friction therebetween. The retaining ring 80 is used to secure the user operating part 72 on the mounting part 70. The magnet 74 is fixed to the user operating part 72, while the Hall Effect sensing circuits 76 and 78 are fixed to the mounting part 70. The user operating part 72 is operated by the rider between a plurality of height positions (e.g., three height positions in the illustrated embodiment). A detent arrangement can be provided to retain the user operating part 72 relative to the mounting part 70 in each of the height positions as needed and/or desired. In this embodiment, the front suspension fork 14 has three different height positions. If the Hall Effect sensing circuits 76 and 78 do not detect the magnet 74, the height controller 52 defines the user operating part 72 as being disposed in a datum position. Therefore it is not necessary to use three Hall Effect sensing circuits for detecting three different height positions.

In particular, the user operating part 72 is in a first height position when the user operating part 72 is rotated such that the magnet 74 is offset from the Hall Effect sensing circuits 76 and 78. When the user operating part 72 is rotated such that the magnet 74 is offset from the Hall Effect circuits 76 and 78, the Hall Effect circuits 76 and 78 do not output any control signals to the signal receiving section 52a of the height controller 52. In other words, the absence of any suspension height control signals is detected by the height control circuit and the microcomputer of the height controller 52, which then causes the height controller 52 to output a suspension height control signal indicative of the first height position (e.g., a top suspension height position). The user operating part 72 is in a second height position when the user operating part 72 is rotated such that the magnet 74 is rotated such that the magnet 74 aligns with the Hall Effect sensing circuit 76. When the user operating part 72 is rotated such that the magnet 74 aligns with the Hall Effect sensing circuit 76, the Hall Effect sensing circuit 76 outputs a suspension height control signal to the signal receiving section 52a of the height controller 52 to input the suspension height control signal to the signal receiving section 52a of the height controller 52. In other words, the suspension height control signal from the Hall Effect sensing circuit 76 is detected by the height control circuit and the microcomputer of the height controller 52, which then causes the height controller 52 to output a suspension height control signal indicative of the second height position (e.g., a middle suspension height position). The user operating part 72 is in a third height position when the user operating part 72 is rotated such that the magnet 74 is rotated such that the magnet 74 aligns with the Hall Effect sensing circuit 78. When the user operating part 72 is rotated such that the magnet 74 aligns with the Hall Effect sensing circuit 78, the Hall Effect sensing circuit 78 outputs a suspension height control signal to the signal receiving section 52a of the height controller 52 to input the suspension height control signal to the signal receiving section 52a of the height controller 52. In other words, the suspension height control signal from the Hall Effect sensing circuit 78 is detected by the height control circuit and the microcomputer of the height controller 52, which then causes the height controller 52 to output a suspension height control signal indicative of the third height position (e.g., a bottom suspension height position).

As seen in FIG. 2, the lockout drive unit 24 is diagrammatically illustrated, and basically includes a lockout sensor 84 (e.g., a potentiometer) and a lockout motor 86. The lockout motor 86 is operatively coupled to the signal output section 50b of the lockout controller 50 such that the lockout motor 86 is controlled in response to a suspension lockout control signal from the signal output section 50b of the lockout controller 50. The lockout motor 86 drives the lockout device 40 to selectively locks and unlocks the lockout device 40. Since the particulars of the lockout motor 86 and the lockout device 40 can be conventional structures that are known in the bicycle field, the particulars of the lockout motor 86 and the lockout device 40 will not be discussed in detail herein. The lockout sensor 84 is arranged to detect the position of the lockout motor 86 for controlling the operation of the lockout motor 86. The lockout sensor 84 also constitutes one example of a suspension lockout determination section that determines a suspension lockout state of the front suspension fork 14. The lockout sensor 84 can be used to determine a suspension lockout state of the front suspension fork 14 based on the position of the lockout motor 86, with the lockout controller 50 outputting a temporary lockout release signal based on a signal from the lockout sensor 84.

As seen in FIG. 2, the height adjustment drive unit 26 is diagrammatically illustrated, and basically includes a height adjustment sensor 88 (e.g., a potentiometer) and a height adjustment motor 90. The height adjustment motor 90 is operatively coupled to the signal output section 52b of the height controller 52 such that the height adjustment motor 90 is controlled in response to a suspension height adjustment signal from the signal output section 52b of the height controller 52. The height adjustment motor 90 drives the height adjustment device 42 to selectively operate height adjustment device 42. Since the particulars of the height adjustment motor 90 and the height adjustment device 42 can be conventional structures that are known in the bicycle field, the particulars of the height adjustment motor 90 and the height adjustment device 42 will not be discussed in detail herein. The height adjustment sensor 88 is arranged to detect the position of the height adjustment motor 90 for controlling the operation of the height adjustment motor 90. The height adjustment sensor 88 also constitutes one example of a suspension lockout determination section that determines a suspension lockout state of the front suspension fork 14. The height adjustment sensor 88 can be used to determine a suspension lockout state of the front suspension fork 14 based on the operation of the height adjustment motor 90, with the lockout controller 50 outputting a temporary lockout release signal based on a signal from the height adjustment sensor 88.

Figure 10:
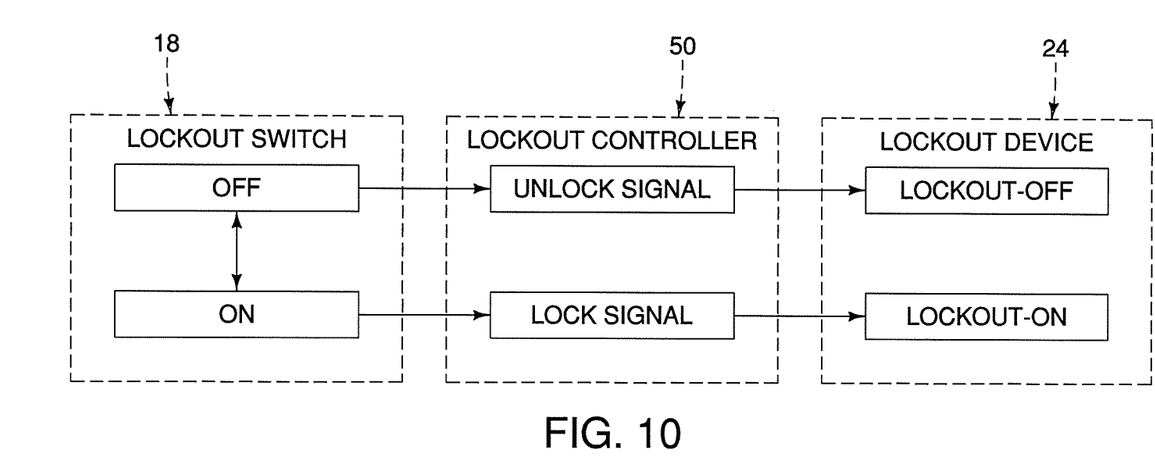
FIG. 10 is a diagrammatic flow chart illustrating the lockout control operation performed by the electronic suspension control apparatus illustrated in FIG. 2 in general terms for locking or unlocking the front suspension.

Referring now to the flow diagram of FIG. 10. The flow diagram of FIG. 10 diagrammatically illustrates the lockout control operation performed by the electronic suspension control unit 16 illustrated in FIG. 2 in general terms for locking or unlocking the front suspension. The flow diagram of FIG. 10 does not an actual representation of an algorithm executed by the electronic suspension control unit 16 that is illustrated in FIG. 2. Rather, the flow diagram of FIG. 10 generally explains a time sequence of the lockout control operation without being confined by the actual structure of the electronic suspension control unit 16 that is illustrated in FIG. 2.

Basically, as seen in the flow diagram of FIG. 10, operation of the suspension lockout control device 18 results in either a lockout signal or a release (unlock) signal being sent to the lockout controller 50. Since only the single Hall Effect sensing circuit 66 is used to detect the magnet 64, the lockout controller 50 determines the user operating part 62 to be disposed in a datum position which corresponds to an off position such that the lockout controller 50 determines the suspension lockout control device 18 is in the unlocked (release) position. Thus, in this illustrated embodiment, the lockout controller 50 continuously monitors the position of the user operating part 62 of the suspension lockout control device 18 based on the existence or absence of the input or suspension lockout control signal currently being received by the lockout controller 50 from the suspension lockout control device 18. The lockout controller 50 outputs the lockout (lock) signal or the release (unlock) signal to the lockout drive unit 24 depending on the position of the user operating part 62 of the suspension lockout control device 18. The lockout drive unit 24 operates the lockout motor 86

Figure 11:
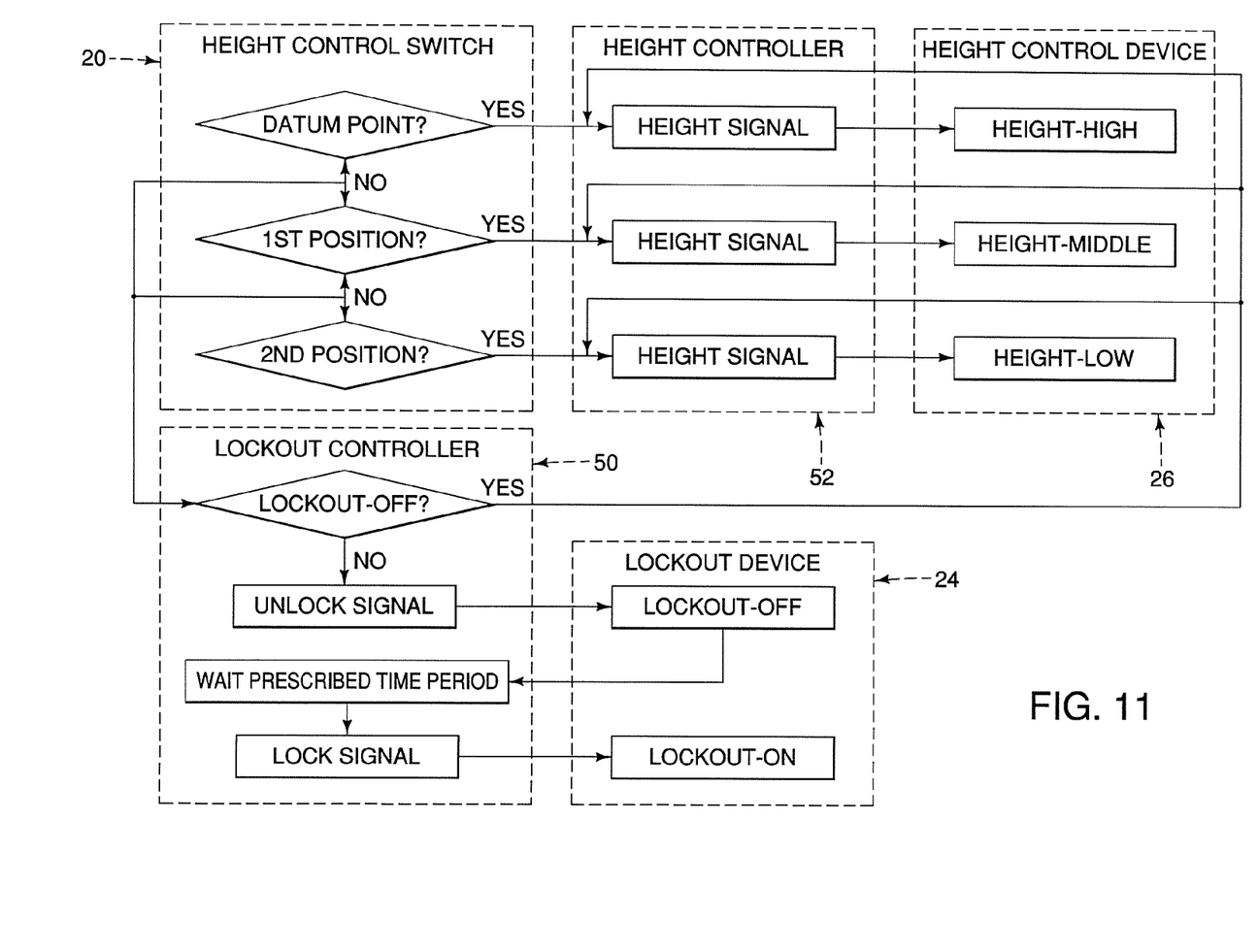
FIG. 11 is a diagrammatic flow chart illustrating the height adjustment control operation with the temporary lockout release operation in general terms for temporarily unlocking the front suspension during the height adjustment control operation performed by the electronic suspension control apparatus illustrated in FIG. 2.

Referring now to the flow diagram of FIG. 11. The flow diagram of FIG. 11 diagrammatically illustrates the height adjustment control operation with the temporary lockout release operation in general terms for temporarily unlocking the front suspension during the height adjustment control operation performed by the electronic suspension control apparatus illustrated in FIG. 2. The flow diagram of FIG. 11 does not an actual representation of an algorithm executed by the electronic suspension control unit 16 that is illustrated in FIG. 2. Rather, the flow diagram of FIG. 11 generally explains a time sequence of the height adjustment control operation without being confined by the actual structure of the electronic suspension control unit 16 that is illustrated in FIG. 2.

Basically, as seen in the flow diagram of FIG. 11, operation of the suspension height control device 20 results in a height adjustment signal being sent to the height controller 52 and a temporary lockout release signal is sent to the lockout controller 50. In this flow diagram of FIG. 11, the suspension height adjustment signals for selecting the suspension height and the lockout control signals for releasing lockout are output at the almost same time. This output timing is not limited to the illustrated embodiment. It is acceptable for the electronic suspension control unit 16 to output the height adjustment signal after the lockout signal has been outputted. Likewise, it is acceptable for the electronic suspension control unit 16 to output lockout signal after the height adjustment signal has been outputted. This output timing depends on the structure of the suspension.

In the illustrated embodiment, the height controller 52 is electrically connected to the suspension height control device 20 such that the height controller 52 is effectively monitoring the suspension height control device 20 in a continuous manner. In other words, the signal receiving section 52*a* of the height controller 52 either receives no signal (datum point—high suspension height position), a first switch position signal (middle suspension height position) or a second switch position signal (low suspension height position). In particular, when the magnet 74 of the user operating part 72 is offset from the Hall Effect sensing circuits 76 and 78, the Hall Effect circuits 76 and 78 do not output any control signals to the signal receiving section 52*a* of the height controller 52, which then causes the height controller 52 to output a suspension height control signal indicative of the second height position (e.g., a middle suspension height position) to the height control device 26. When the magnet 74 of the user operating part 72 aligns with the Hall Effect sensing circuit 76, the Hall Effect sensing circuit 76 outputs a suspension height control signal to the signal receiving section 52*a* of the height controller 52, which then causes the height controller 52 to output a suspension height control signal indicative of the second height position (e.g., a middle suspension height position) to the height control device 26. When the magnet 74 of the user operating part 72 aligns with the Hall Effect sensing circuit 78, the Hall Effect sensing circuit 78 outputs a suspension height control signal to the signal receiving section 52*a* of the height controller 52, which then causes the height controller 52 to output a suspension height control signal indicative of the third height position (e.g., a bottom suspension height position) to the height control device 26.

As seen in the flow diagram of FIG. 11, when the user operating part 72 is moved between the three switch positions, a temporary lockout release signal is sent to the lockout controller 50. In FIG. 11, for the sake of illustration, the temporary lockout release signal is illustrated as being sent from the user operating part 72, which can be accomplished by providing a movement sensor that detects movement of the user operating part 72. However, in this illustrated embodiment, as seen in FIG. 2, the height controller 52 preferably sends the temporary lockout release signal in response to the movement of the user operating part 72 is moved between the three switch positions or based on a signal from either of the sensors 88 or 90. Thus, in this illustrated embodiment, the height controller 52 continuously monitors the position of the user operating part 72.

In any event, upon receiving the temporary lockout release signal, the lockout controller 50 first determines if a suspension lockout state exists (e.g., lockout-off or lockout-on). If the lockout controller 50 determines a lockout-off state exists (i.e., the suspension is unlocked), then the signal output section 50*b* of the lockout controller 50 outputs a height adjustment signal to the height controller 52 to send the appropriate suspension height adjustment signal. If the lockout controller 50 determines a lockout-on state exists, then the signal output section 50*b* of the lockout controller 50 sends a temporary lockout release signal (i.e., a lockout-off or unlock signal) to the lockout device 24 to operate the lockout motor 86 to unlock the front suspension fork 14. Next, the lockout controller 50 waits a prescribed time period after outputting the temporary lockout release signal. Then the signal output section 50*b* of the lockout controller 50 automatically outputs a lockout signal to the lockout device 24 to operate the lockout motor 86 to lock the front suspension fork 14 after the prescribed time period has lapsed after outputting the temporary lockout release signal without any further actions by the rider.

Instead of waiting until a prescribed time period has lapsed to output a lockout signal for relocking the lockout device 24, the lockout controller 50 can outputs a lockout signal once it has been determine that the appropriate suspension height has been reached in the front suspension fork 14. This can be accomplished in several ways. For example, a stroke sensor is disposed on the front suspension fork 14 to detect the suspension height (stroke) of the front suspension fork 14. This stroke sensor is then used to determine when the appropriate suspension height has been reached in the front suspension fork 14. Thus, the lockout controller 50 outputs a lockout signal based on the detected signal from the stroke sensor, when the detected signal from the stroke sensor indicates that the appropriate (desired or prescribed) suspension height (stroke) has been reached in the front suspension fork 14.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "signal" as used herein does not require a physical signal to be present. Rather, the term "signal" as used herein includes an absence of a physical signal that is indicative a change in an operating condition or state.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An electronic suspension control apparatus controlling a lockout device comprising:
   a signal receiving section that selectively receives input signals;
   a suspension lockout determination section that determines a suspension lockout state; and
   a signal output section that outputs a temporary lockout release signal that unlocks the lockout device temporarily in response to the signal receiving section receiving a suspension height adjustment signal as one of the input signals while the suspension lockout determination section determines that the suspension lockout state exists,
   the signal output section automatically outputting a lockout signal after outputting the temporary lockout release signal.

2. The electronic suspension control apparatus according to claim 1, wherein
   the signal output section outputs a lockout signal after a prescribed time period has lapsed after outputting the temporary lockout release signal.

3. The electronic suspension control apparatus according to claim 1, further comprising
   a user input device operatively coupled to the signal receiving section to input the suspension height adjustment signal.

4. The electronic suspension control apparatus according to claim 1, further comprising
   a user input device operatively coupled to the signal receiving section to input a suspension lockout control signal.

5. The electronic suspension control apparatus according to claim 1, further comprising
   a first user input device operatively coupled to the signal receiving section to input a suspension lockout control signal; and
   a second user input device operatively coupled to the signal receiving section to input the suspension height adjustment signal.

6. The electronic suspension control apparatus according to claim 1, further comprising
   a motor operatively coupled to the signal output section such that the motor is controlled in response to a suspension lockout control signal from the signal output section.

7. The electronic suspension control apparatus according to claim 1, further comprising
   a motor operatively coupled to the signal output section such that the motor is controlled in response to the suspension height adjustment signal from the signal output section.

\* \* \* \* \*